UNITED STATES PATENT OFFICE.

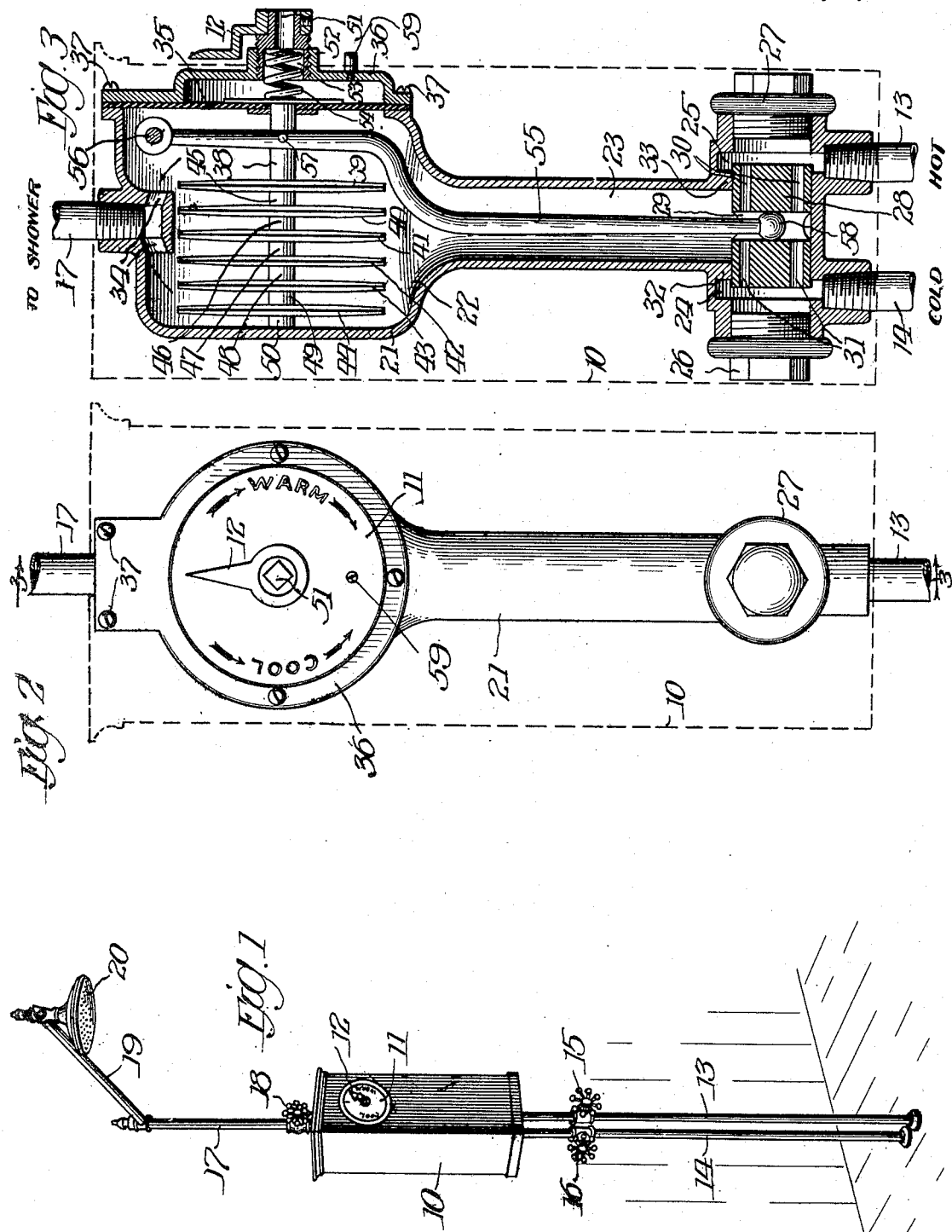

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS.

TEMPERATURE-CONTROLLING DEVICE.

1,137,921.   Specification of Letters Patent.   Patented May 4, 1915.

Application filed April 20, 1914. Serial No. 833,192.

*To all whom it may concern:*

Be it known that I, MORTON O. SNEDIKER, a citizen of the United States, residing at Chicago, in the county of Cook and State of Illinois, have invented certain new and useful Improvements in Temperature-Controlling Devices, of which the following is a specification.

My invention relates to temperature controlling devices, and refers particularly to devices used for controlling the temperature of water in shower baths and similar apparatus.

In shower baths and the like, the temperature of the water coming from the delivery spray is controlled by the proportionate mixture of hot and cold water supplied to the spraying nozzle. When this temperature is controlled merely by hand regulation of the valves of the hot and cold water pipes, it is very difficult to obtain exactly the desired temperature, and when it is attained this temperature is apt to vary, on account of the variation in temperature or pressure of either the cold or hot water supplied to the shower bath.

It is the object of my invention to provide mechanism which will serve to mix the hot and cold water in such a proportion as to maintain a predetermined temperature on delivery at the spraying nozzle of a shower bath, or any other desired apparatus.

It is a further object of my invention to provide means for quickly and easily changing this predetermined temperature.

These and other advantages of my invention will be more readily understood by reference to the accompanying drawings, in which:

Figure 1 is a perspective of a shower bath to which my temperature controlling device has been applied. Fig. 2 is a front elevation of my temperature controlling device, and Fig. 3 is a vertical longitudinal section taken on the line 3—3 of Fig. 2.

As most clearly shown in Fig. 1, the temperature controlling device is contained within the box 10, on the front of which is a dial 11 provided with a pointer 12 which may be rotated to any desired position. The hot water pipe 13, and the cold water pipe 14, provided with the valves 15 and 16 respectively, pass to the temperature controlling device contained within the box 10, and from this device passes the outlet pipe 17, having the valve 18. The pipe 17 communicates with the pipe 19, provided at its end with the spraying nozzle 20.

The temperature controlling device itself is represented as a whole by 21, and, as previously explained, is contained within the box 10. The device 21 comprises a mixing chamber 22, a mixing passage 23 and the valve chambers 24 and 25. Cold water pipe 14 communicates with the valve chamber 24, which is closed by the plug 26, and the hot water pipe 13 communicates with the valve chamber 25, which is closed by the plug 27. Between the valve chambers 24 and 25 and at the lower end of the mixing passage 23 is located the controlling valve 28, provided with a central vertical passage 29. Leading from the passage 29 to the valve chamber 25 are the ports 30, and leading from the passage 29 to the valve chamber 24 are the ports 31, these ports passing horizontally through the controlling valve 28. The valve 28 is a slide-valve and fits tightly within the partitions 32 and 33, located between the valve chambers 24 and 25 respectively and the mixing passage 23. At their outer portions, where they are engaged by the plugs 26 and 27, the valve chambers 24 and 25 are constricted in diameter so that the ends of the controlling valve 28 will just fit within these constricted portions.

The pipe 17 communicates with the upper end of the mixing chamber 22 through the ports 34. The front of the mixing chamber 21 is closed by means of the diaphragm 35, which is secured to the casing of the mixing chamber by the front plate 36, held in position by the screws 37. Fastened to the diaphragm 35 is the rod 38, leading to one side of the expansible disk 39, which is filled with ether, or other liquid having a low boiling point. A plurality of similar disks 40, 41, 42, 43 and 44 are connected in series by the short rods 45, 46, 47, 48 and 49 respectively, and the short rod 50 serves to fasten the disk 44 to the rear casing of the mixing chamber 22. Each of the disks 40, 41, 42, 43 and 44 is supplied with liquid of a low boiling point in the same manner as is the disk 39.

The threaded plug 51 engages the lug 52 in the front plate 36, this plug being provided with a pointer 12. At its inner end the plug 51 has the recess 53, which serves to form a seat for the compression spring 54, the opposite end of this spring engaging the diaphragm 35.

The lever 55 is pivotally attached to the casing of the mixing chamber 22 at 56, and by means of the pin 57 has engagement with the rod 38, so that any movement of this rod is communicated to the lever 55. At its lower end the lever 55 is provided with the ball 58, which is located within the passage 29 of the controlling valve 28, so that as the lever 55 is moved the controlling valve 28 is caused to slide backward or forward, as the case may be.

Having thus described the construction of the various parts used in my invention, the operation of the same may now be readily understood.

Let us assume that it is desired to have water delivered from the spray 20 to the shower bath at a luke warm temperature. The pointer 12 is for this purpose adjusted in a position midway between "cold" and "warm," as indicated in Figs. 2 and 3. The valves 15 and 16 being opened, water passes from these pipes into the valve chambers 25 and 24 respectively. When the operation of the shower bath is first started, the temperature of the water in the mixing chamber 22 will ordinarily be rather low, and for this reason the liquid within the disks 39 to 44 inclusive will be in a condensed condition, thereby causing the rod 38 and the rods 45 to 49 inclusive to move to the left, according to the representation of Fig. 3. This will carry the lower end of the lever 55 to the left, thereby opening the valve chamber 25 and closing the valve chamber 24. This will cause a greater proportion of hot water to pass through the ports 30 than cold water through the ports 31, and the temperature of the water in the mixing chamber 22 will, therefore, rise and the disks 39 to 44 will expand until further expansion is stopped by the action of the spring 54 against the diaphragm 35. As this expansion of the disks takes place, the lower end of the lever 55 will be moved to the right and more cold water and less hot water will be admitted into the mixing passage 23 and the mixing chamber 22. After the predetermined temperature has been attained it will be automatically maintained, inasmuch as in case the respective temperatures of the water in passing through the pipes 13 and 14 becomes altered, the position of the controlling valve 28 will be automatically regulated by reason of the effect of such altered temperature on the disks 39 to 44 inclusive.

If it is desired to have the water delivered at the spraying nozzle 20 very cold, the pointer 12 may be moved in a contra-clockwise direction until it engages the stop 59. The tension of the spring 54 is thereby released and the diaphragm 35 is allowed to move outwardly, thereby moving the controlling valve 28 so that only cold water is admitted to the mixing chamber. Similarly, if it is desired to have the shower very warm, the pointer 12 is moved in a clockwise direction, thereby increasing the tension on the spring 54 and forcing the diaphragm 35 inwardly so that the controlling valve 28 is moved to allow only, or a very large proportion of, hot water to enter the mixing passage 23 and the mixing chamber 22. Although this hot water tends to expand the disks 39 to 44 inclusive, this expansion is resisted by the tension of the spring 54.

In ordinary operation the valves 15 and 16 are left open, and when it is desired to use the shower bath it is only necessary to set the pointer 12 in the desired position and open the valve 18. In the manner described above, the temperature of the water delivered from the spraying nozzle 20 is automatically kept constant, and the actual temperature may be quickly changed by moving the pointer 12.

On account of the fact that the discharge openings of the spraying nozzle 20 are comparatively small, the water within the chamber 22 may attain a considerable pressure and this pressure is subject to considerable variation, according to the amount the valve 18 is opened and according to the pressure of the entire system with which the pipes 13 and 14 are connected.

It will be evident that with an increase of pressure within the chamber 22 more resistance will be offered to the action of the disks 39 to 44 inclusive. This would seriously interfere with the correct operation of the device, were it not for the compensating action of the diaphragm 35. As the pressure in the chamber 22 increases, the diaphragm 35 is forced outwardly and carries with it the rod 38 and the rods 45 to 49 inclusive, thereby compensating for the pressure on the disks 39 to 44 inclusive so that these disks will respond to temperature changes in exactly the same manner as though the pressure of the water in the chamber 22 were normal.

It will be apparent to those skilled in the art that many changes could be made in the detailed construction of the parts which I have described without departing from the spirit or scope of my invention.

What I claim is:

1. In a temperature controlling device, the combination of a casing having cold and hot fluid inlets thereto and an outlet therefrom, a mixing chamber within said casing, a valve for controlling the proportional amounts of fluid passing from said inlets to said mixing chamber, a diaphragm in said casing, a hollow disk within said mixing chamber, said disk being provided with readily volatile fluid, connecting means between said disk and said diaphragm, whereby on increase of pressure of the fluid in said mixing chamber, said diaphragm will be moved outwardly to expand said disk, thereby compensating for said increased pressure on said disk, means for actuating said valve by the change in volume of said disk, whereby a predetermined temperature of the fluid in said mixing chamber is maintained, a spring engaging said diaphragm on one end, and a threaded plug engaging said spring on its opposite end, whereby, on rotation of said plug, the tension of said spring is changed and the predetermined temperature of the fluid within said mixing chamber is correspondingly changed, substantially as described.

2. In a temperature controlling device, the combination of a casing having cold and hot water inlets thereto and an outlet therefrom, a mixing chamber within said casing, a slide-valve for controlling the proportional amounts of water passing from said inlets to said mixing chamber, a plurality of hollow expansible disks within said mixing chamber, said disks being mechanically connected with each other in series, and each of said disks being substantially filled with a readily volatile fluid, a diaphragm in said casing, connecting means between said series of disks and said diaphragm, whereby on increase of pressure of the fluid in said mixing chamber, said diaphragm will be moved outwardly to expand said disks, thereby compensating for said increased pressure on said disks, means for actuating said valve by the change in volume of said disks, whereby a predetermined temperature of the water in said mixing chamber is maintained, a spring engaging said diaphragm on one end, and a threaded plug engaging said spring on its opposite end, whereby, on rotation of said plug, the tension of said spring is changed and the predetermined temperature of the water in said mixing chamber is correspondingly changed, substantially as described.

3. In a temperature controlling device, the combination of a casing having inlet and outlet ports, a valve controlling one of said ports, thermostatic means for actuating said valve, a diaphragm connected to said thermostat, and a spring associated with said diaphragm and acting to restrict the expansion of said thermostat, an increased pressure within said casing acting on said diaphragm to compress said spring and reduce the resistance to be overcome by said thermostat, substantially as described.

4. In a device of the class described, the combination of a casing having a plurality of inlets and an outlet, a valve controlling said inlets, a thermostat including a self-expansible element disposed within said casing, and adapted to be affected by pressure within said casing, spring means and a diaphragm associated with said thermostat said diaphragm being adapted to act upon said spring means and relatively reduce the resistance to expansion of said thermostat in proportion to the increase in pressure within said casing, substantially as described.

5. In a device of the class described, the combination of a casing having hot and cold water inlets and an outlet, a valve controlling said inlets, a plurality of volatile-fluid-containing-thermostatic units controlling the actuation of said valve, a spring against which said thermostats act, and pressure-relieving means associated with said thermostatic valve-actuating device and arranged to counter-act the compressive force of the fluid external to said disks in proportion as the pressure varies within said chamber, substantially as described.

MORTON O. SNEDIKER.

Witnesses:
H. E. RIGGS,
P. O. KODERISCH.